US007849931B2

(12) United States Patent
Ng

(10) Patent No.: US 7,849,931 B2
(45) Date of Patent: Dec. 14, 2010

(54) INTEGRATED ENVIRONMENTAL CONTROL SYSTEM FOR A CARGO STOWAGE COMPARTMENT ON A MOBILE PLATFORM

(75) Inventor: Casey Y. K. Ng, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 596 days.

(21) Appl. No.: 11/517,424

(22) Filed: Sep. 7, 2006

(65) Prior Publication Data

US 2008/0064316 A1 Mar. 13, 2008

(51) Int. Cl.
*A62C 3/07* (2006.01)
*A62C 35/00* (2006.01)
*A62C 2/00* (2006.01)
*A62C 3/06* (2006.01)
*A62C 37/10* (2006.01)
*B64D 13/02* (2006.01)
*B64D 13/00* (2006.01)
*F24F 13/06* (2006.01)
*A62C 2/06* (2006.01)

(52) U.S. Cl. ............................. 169/62; 169/16; 169/46; 169/56; 169/60; 169/61; 454/71; 454/76; 454/256; 454/257; 454/258

(58) Field of Classification Search .................. 169/62, 169/16, 45, 56, 60, 61; 454/256–258, 71, 454/76

See application file for complete search history.

(56) References Cited

U.S. PATENT DOCUMENTS

| 2,466,779 | A | * | 4/1949 | Pevney | 244/59 |
| 2,473,699 | A | * | 6/1949 | Bennett | 126/110 R |
| 3,303,886 | A | * | 2/1967 | John et al. | 169/16 |
| 3,465,827 | A | * | 9/1969 | Shinbaum et al. | 169/61 |
| 3,986,560 | A | * | 10/1976 | Heath et al. | 169/61 |
| 4,351,394 | A | * | 9/1982 | Enk | 169/61 |
| 4,482,114 | A | * | 11/1984 | Gupta et al. | 244/134 B |
| 4,726,426 | A | * | 2/1988 | Miller | 169/62 |
| 4,818,970 | A | * | 4/1989 | Natale et al. | 340/539.26 |
| 5,114,100 | A | * | 5/1992 | Rudolph et al. | 244/134 C |
| 5,215,498 | A | * | 6/1993 | Wong et al. | 454/208 |
| 5,260,691 | A | * | 11/1993 | Shyu | 340/589 |
| 5,515,691 | A | * | 5/1996 | Wertenbach et al. | 62/133 |

(Continued)

*Primary Examiner*—Len Tran
*Assistant Examiner*—Steven M Cernoch
(74) *Attorney, Agent, or Firm*—Harness, Dickey & Pierce, P.L.C.

(57) ABSTRACT

An integrated environmental control system for a cargo stowage compartment in a mobile platform, for example in a commercial passenger jet aircraft. A fire detection/suppression subsystem is integrated together with an airflow management system. The airflow management system operates to circulate, and optionally to heat or cool, air withdrawn from a cargo stowage compartment of the aircraft before the air is released back into the cargo stowage compartment. A fire suppression substance, for example, Halon gas, can be discharged directly into a recirculation duct of the airflow management system, thus reducing the duct work required to achieve fire suppression and ventilation operations for the cargo stowage compartment. The integration of the fire detection/suppression and airflow management system operations reduces the overall amount, complexity and weight of the ducting employed in a cargo stowage compartment of a commercial jet aircraft. This integration also eliminates or minimizes potential integration and control issues such as smoke penetration from the cargo stowage compartment to the passenger cabin.

15 Claims, 2 Drawing Sheets

U.S. PATENT DOCUMENTS 5,848,652 A * 12/1998 Bennett ........................ 169/62
5,914,453 A *  6/1999 James et al. .................... 95/14
6,390,203 B1 *  5/2002 Borisov et al. ................ 169/62
6,601,653 B2 *  8/2003 Grabow et al. ................ 169/16
6,676,081 B2 *  1/2004 Grabow et al. ........... 244/129.2

* cited by examiner

INTEGRATED ENVIRONMENTAL CONTROL SYSTEM FOR A CARGO STOWAGE COMPARTMENT ON A MOBILE PLATFORM

FIELD

The present disclosure relates to a system and method for integrating fire detection/suppression and airflow systems to manage an ambient environment within a compartment of a mobile platform.

BACKGROUND

Existing cargo stowage compartments on mobile platforms, for example on commercial passenger aircraft, make use of systems for controlling the temperature within the cargo stowage compartment. Such mobile platforms also make use of fire detection/suppression systems for detecting and suppressing any fires that may develop within the cargo stowage compartment. Temperature control and ventilation of the cargo stowage compartment is particularly important since the cargo stowage compartment is often used for temporarily holding live animals and perishables. Thus, the temperature and quality of air within the cargo stowage compartment of a mobile platform, and particularly of commercial passenger aircraft, is an important consideration.

Traditional cargo stowage compartments in various forms of mobile platforms, and particularly in commercial passenger aircraft, have utilized a forced air approach for ventilating the cargo stowage compartment. The forced air approach involves recirculating cargo compartment air, or passenger cabin return air, or equipment cooling exhaust air, into the cargo compartment through a network of ducting.

Traditional mobile platform cargo fire protection systems, and particularly those employed with commercial passenger aircraft, consist of a fire detection system and a fire suppression system using a fire suppression substance. In some applications a Halon gas is used as the fire suppression agent. A typical fire detection system utilizes photoelectric detection technology and may include a tubing network or a number of stand alone detectors to sample air from various locations within the cargo stowage compartment for the presence of smoke. The fire detection system provides the appropriate signal for the cargo air systems and cargo fire suppression system to work together in the event of a fire within the cargo stowage compartment. The fire suppression system typically uses a Halon agent to extinguish and suppress any fires. The fire suppression system typically also includes a network of dedicated tubing to distribute the fire suppression agent to various locations within the cargo stowage compartment.

These subsystems are traditionally developed and designed independently, even though they must work together in all operating conditions, and particularly so during a fire event. This independent approach requires separate and significant efforts to develop/integrate/coordinate into the mobile platform the numerous and/or similar interfaces between the ventilator and fire detection/suppression systems. Significant effort and expense is also often required to interface these systems with other subsystems of the mobile platform, and also specifically to the cargo compartment structure. The design of present day ventilation and fire detection/suppression subsystems often makes it difficult for each subsystem to meet its performance efficiently. For example, airflow patterns produced by a heating system may in fact work to hinder the detection of a fire within the cargo stowage compartment. The independent design and implementation of fire detection/suppression and ventilation subsystems may also complicate the integration of such subsystems and make optimizing the performance of each subsystem difficult.

Accordingly, it would be desirable to provide an integrated environmental control system for a cargo stowage compartment of a mobile platform that enables ventilation and fire detection/suppression operations to be integrated via a single system. It would further be highly desirable to provide such a system and method in which integration of fire detection/suppression and ventilation subsystems can be accomplished with little or no additional duct work being required in the cargo stowage compartment.

SUMMARY

The present disclosure relates to an integrated environmental control system and method. The system and method involves integrating fire detection/suppression and airflow management systems for a compartment of a mobile platform. The system optimizes the operation of each of the fire detection/suppression and airflow management systems without complicating the construction or integration of each system.

In one exemplary embodiment, an airflow management system operates as a ventilation control subsystem to enable the circulation of air into a cargo compartment of a mobile platform. A temperature sensor is used to sense the temperature within the compartment. An environmental controller responsive to a signal from the temperature sensor controls one or more subsystems disposed in an airflow circulation duct of the airflow management system. In one embodiment, a heater located in the airflow circulation duct forms one such subsystem. The heater is controlled by the environmental controller to heat the air being circulated into the compartment. In another embodiment a fan is located in the circulation duct. The fan is also controlled by the environmental controller for assisting in the circulation of air through the airflow circulation duct. In another embodiment a valve is controlled by the environmental controller to further assist in controlling the circulation of airflow back into the compartment.

In one embodiment the system includes a fire detection/suppression subsystem that is used to inject a fire suppression agent or substance directly into a duct of the airflow management system in the event that a fire or smoke is detected within the compartment. Releasing the fire suppression agent or substance into the duct allows the substance to be channeled via ventilation duct work in the compartment and released at one or more predetermined locations within the compartment to assure effective dispersing of the agent or substance within the compartment. In one embodiment, a fire detection/suppression controller is used to control the release of the fire suppression agent or substance and to monitor the output of the suppression agent or substance that is disposed in a compartment. The fire detection/suppression controller is in communication with an environmental controller such that the environmental controller can control the various subsystems within an airflow management subsystem to optimize the release of the fire suppression agent or substance within the compartment. Optionally, the fire detection/suppression controller and environmental controller could be integrated as one unit/controller.

In one particular embodiment a pair of independent airflow circulation subsystems is used in separate forward and aft compartments of a mobile platform. In this embodiment the fire detection/suppression subsystem includes a plurality of valves that are controlled by the fire detection/suppression controller such that in the event of a fire or smoke being detected in either one of the compartments, the entire quantity of fire suppression substance can be directed into the airflow management system associated with that particular compartment experiencing the fire event or smoke.

The various embodiments enable integration of the fire detection/suppression subsystem and the airflow management system required for a compartment in a manner that minimizes the need for duct work associated with each of these subsystems, and that optimizes the operation of each subsystem.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
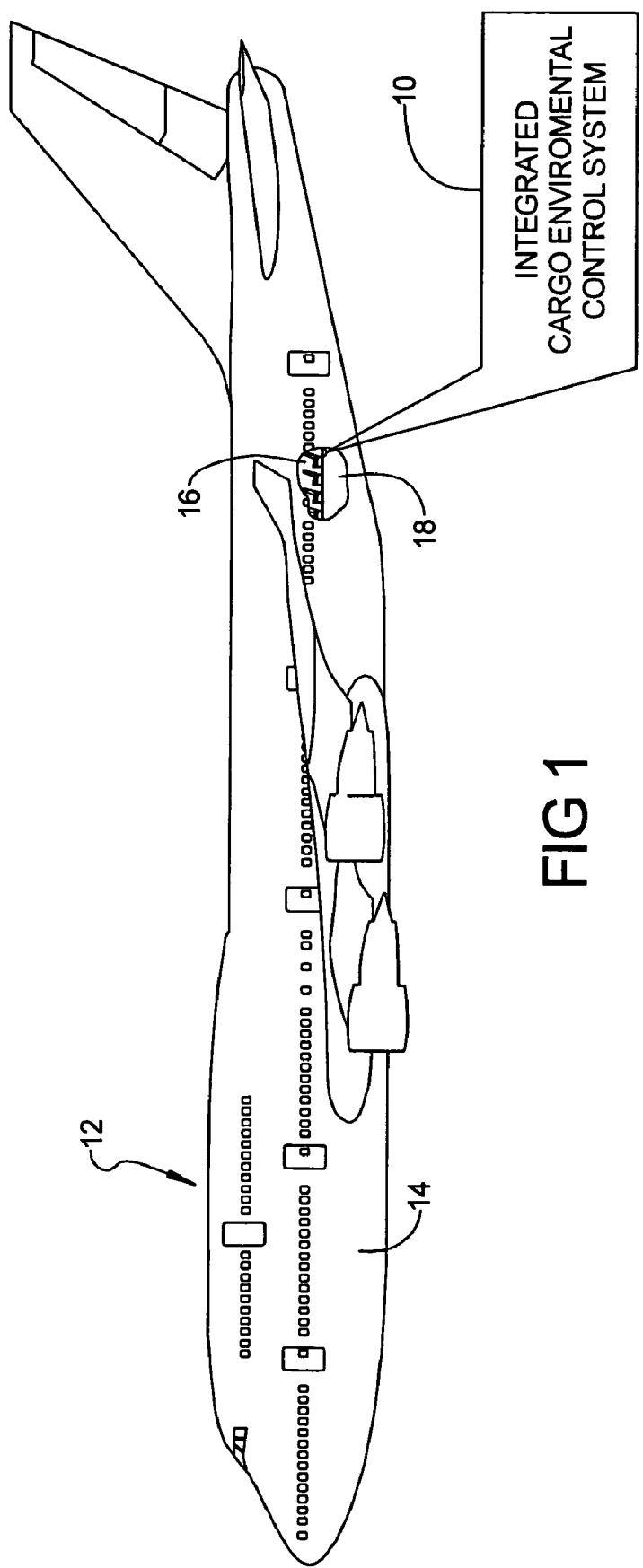
FIG. 1 is a simplified view of a mobile platform, in this example a commercial passenger aircraft, showing a portion of the cabin area and a portion of the cargo stowage compartment, with a highly simplified representation of an integrated environmental control system of the present disclosure.

Referring to FIG. 1, there is shown a mobile platform 12 that includes an integrated, cargo environmental control system 10. The system 10 is located within a fuselage 14 of the mobile platform 12. In this example, the mobile platform 12 forms a commercial passenger jet aircraft, however it will be appreciated that the system 10 can be used with virtually any form of mobile platform such as a ship, bus, truck, van, train or rotorcraft. The system 10 could also be integrated into fixed structures such as buildings.

In this example, the aircraft 12 includes a passenger cabin area 16 and a cargo stowage compartment or area 18 (often referred to in the aircraft industry as the "lower lobe"). As will be appreciated, fire detection/suppression and ventilation of the cargo stowage compartment 18 is an important operational consideration because live animals and other articles subject to environmental considerations are often transported within compartment 18. Often, in larger commercial jet passenger aircraft, the cargo stowage compartment 18 is divided into a forward compartment and an aft compartment. The system 10, as will be appreciated from the following discussion, can be integrated into a mobile platform that makes use of either a single large stowage compartment, or alternatively a segmented cargo stowage compartment. Further, the system can be integrated in other compartment(s) of a mobile platform (e.g., cockpit, main cabin, or avionics bay).

Figure 2:
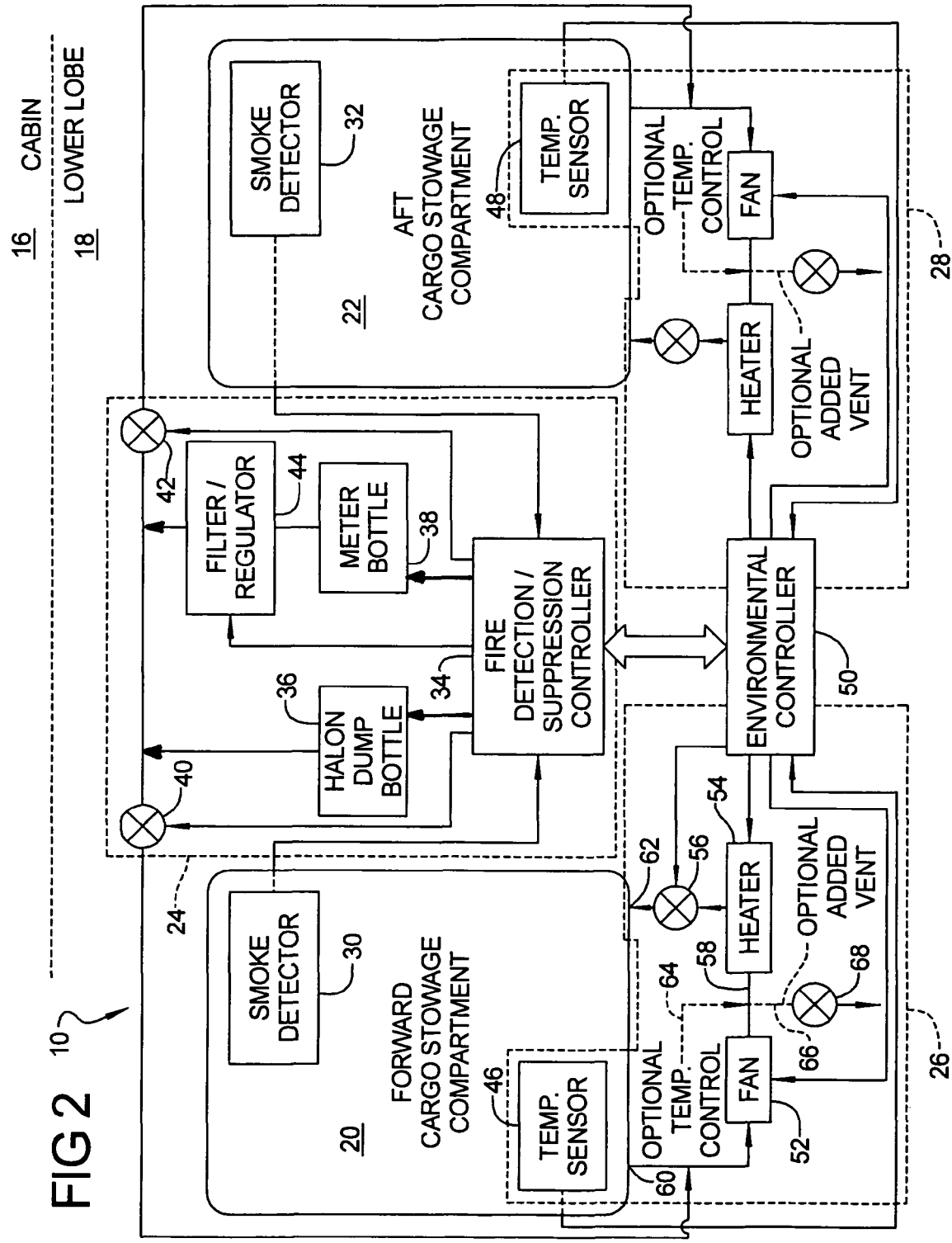
FIG. 2 is a schematic block diagram of one exemplary embodiment of the integrated cargo environmental control system shown in FIG. 1.

Referring to FIG. 2, one exemplary embodiment of the integrated cargo environmental control system 10 is illustrated. The system 10 provides a significant advantage in integrating operation of a fire detection/suppression subsystem with a ventilation or temperature control subsystem in a manner that minimizes the duct work required to implement these two subsystems within the cargo stowage compartment 18. Merely as an example, in FIG. 2 the cargo stowage compartment 18 is illustrated as having a forward cargo stowage compartment 20 and an aft stowage compartment 22. A fire detection/suppression subsystem 24 is used to supply a fire suppression substance and to monitor for the presence of fire and/or smoke within the cargo compartments 20 and 22. The forward cargo stowage compartment 20 is in communication with a first airflow management system 26, while the aft cargo stowage compartment 22 is in communication with a second airflow management system 28. If only a single cargo stowage compartment is used, then only one of the systems 26 and 28 will be needed. Systems 26 and 28 in this example include identical components and are identical in operation. As such, the components and operation of only system 26 will be described in detail. It is understood that the systems could differ to facilitate different ambient conditions in the compartments, or to allow one compartment to be uncooled and/or non-ventilated. A system can have fewer or additional components than described herein without departing from the scope of this disclosure. Certain components of the two systems may be intermixed and share hardware. Further, there can be three or more compartments and corresponding systems.

In the forward cargo stowage compartment 20 is disposed a smoke detector 30, which preferably comprises an electric smoke detector. Similarly, in the aft cargo stowage compartment 22 is disposed a separate smoke detector 32, which also may be an electric smoke detector. It will be understood that there could be multiple smoke detectors spaced about each compartment. Smoke detectors 30 and 32 are each in communication with a fire detection/suppression controller 34 of the fire detection/suppression subsystem 24. The fire detection/suppression subsystem 24 further includes a first reservoir that forms a "dump bottle" 36 and a second reservoir that forms a "meter bottle" 38. Valves 40 and 42 are also in communication with the fire detection/suppression controller 34. A filter/regulator 44 is also in communication with the fire detection/suppression controller 34 and helps to regulate the flow of a fire suppression substance released from meter bottle 38. The fire suppression agent or substance contained in reservoirs 36 and 38 is preferably Halon gas, although any other suitable fire suppression agents could be employed. For example, a nitrogen and water mixture might also form a suitable fire suppression agent. Halon gas, however, is a colorless, odorless gas that is widely employed in fire suppression systems and has proven especially effective in quickly extinguishing fires. Halon dump bottle 36 operates to supply a rapid quantity or "burst" of Halon gas that can be released into either of the airflow management systems 26 or 28, depending upon which of the valves 40 or 42 are controllably opened by suitable signals from the fire detection/suppression controller 34. Similarly, a selective opening of either valve 40 or valve 42 controls the flow of Halon gas from meter bottle 38 into either airflow management system 26 or system 28. Meter bottle 38 releases a metered quantity of a fire suppression substance, preferably Halon gas that is further filtered and regulated by the filter/regulator 44, before being directed into one or the other of the airflow management systems 26 or 28. Each dump/metered bottle 36, 38 may contain a conventional control valve (not shown) that opens upon a signal from controller 34 to further assist in controlling the release of the fire suppression substance therefrom.

Further included in forward cargo stowage compartment 20 is a temperature sensor 46. Also included in the aft cargo stowage compartment 22 is a temperature sensor 48. Temperature sensors 46 and 48 each monitor the ambient temperature in their respective cargo stowage compartment 20 or 22 and generate an output signal in accordance with the sensed ambient temperature. With regard to temperature sensor 46, the output signal is input to an environmental controller 50 that forms a common component for both of the airflow management systems 26 and 28. Airflow management system 26 essentially operates to receive air exhausted from its associated cargo stowage compartment 20, to either heat or cool the air, and to recirculate the air back into the cargo stowage compartment 20. Airflow management system 28 operates in identical fashion with regard to its cargo stowage compartment 22. It will be understood that a system which does not fully or partially recirculate air does not depart from the scope of this disclosure.

Airflow management system 26, in one exemplary form, is comprised of a fan 52, a heater 54 and a valve 56 all disposed within a recirculation conduit 58. The recirculation conduit 58 has an input end 60 and an output end 62. Each of the fan 52, heater 54 and valve 56 are controlled by signals from the environmental controller 50. The environmental controller 50 also is in communication with the fire detection/suppression controller 34. This enables the fire detection/suppression subsystem 24 and the airflow of management system 26 to operate in an integrated fashion.

During operation, fan 52 and heater 54, together with valve 56, are controlled such that air can be recirculated out from and back into the forward cargo stowage compartment 20 in a closed loop fashion to maintain a desired ambient temperature within the compartment 20. In the event of operation of the fire detection/suppression subsystem 24, Halon gas would be initially released from the dump bottle 36 into the recirculation conduit 58 and forced by fan 52 through the remainder of the recirculation conduit 58, through output end 62, and back into the cargo storage compartment 20. In this event, heater 54 would be left turned off. It will be appreciated that within the forward cargo stowage compartment 20, suitable ducting exists that disperses either air or the Halon gas generally evenly throughout the cargo stowage compartment 20 through a plurality of strategically located vents. Thus, the same duct work can be used to provide circulation of airflow, as well as the distribution of Halon gas, in the event of a fire event being experienced in the forward cargo stowage compartment 20.

Optionally, an additional duct 64 could be used to provide pre-heated air, for example from an auxiliary power unit (APU) or other subsystem of the aircraft 12 to assist in heating the air being circulated through the recirculation duct 58. Note that duct 64 can also provide pre-cooled air for temperature control. A heat exchanger within duct 64 and/or duct 58 could be incorporated for pre-cooled air. Furthermore, an optional vent 66 and suitable optional valve 68 could be employed to release a portion of the air being recirculated through the recirculation conduit 58 into an ambient environment outside of the aircraft 12. The optional vent 66 would be useful in quickly reducing the temperature of the air circulating in the recirculation conduit 58. In the event that the recirculation of air through the recirculation conduit 58 needs to be completely interrupted, then valve 56 can be closed, which will completely prevent the recirculation of such airflow out through the output end 62 of the recirculation conduit 58.

As will be appreciated, the system 10 enables the fire detection/suppression 24 and each of the airflow management systems 26 and 28 employed in the aircraft 12 to be integrated in operation. This serves to minimize the ducting that is required for achieving ventilation and the release of a fire suppression substance into the forward cargo stowage compartment 20. In a commercial mobile platform such as a commercial passenger jet aircraft, this can save significant complexity, cost and weight. Weight reduction is achieved by eliminating the duplicative duct work in the forward cargo stowage compartment 20 that would otherwise be required to implement the fire detection/suppression subsystems. Additionally, the operation of the components in the airflow management systems 26 and 28 can be controlled in a manner that ensures that if a fire event occurs, the systems 26 and 28 will not hinder the release or dispersion of the fire suppression substance within the cargo compartment 20 or 22.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An integrated environmental control system for a compartment of a mobile platform, the system comprising: an airflow management system having an airflow recirculation conduit for circulating airflow out from said compartment and back into said compartment, to maintain a desired ambient condition within said compartment; a controller for controlling a fan operable to circulate the airflow through the airflow recirculation conduit into the compartment, the fan assisting in controlling the ambient condition of the compartment; a heater in flow communication with the aircraft recirculation conduit for heating the airflow flowing through the airflow recirculation conduit into the compartment, the heater being responsive to the controller to enable the controller to control a temperature of the airflow within the compartment; a fire suppression system in communication with the controller for injecting a quantity of a fire suppression substance into said airflow recirculation conduit in the event a fire is sensed in said compartment; and the controller controlling the heater in coordination with the fire suppression system so that operation of the heater is interrupted by the controller when the fire suppression system is activated.

2. The system of claim 1, wherein said airflow management system further comprises:
   a temperature sensor disposed in said compartment;
   the fan being disposed in said airflow duct; and
   the controller being responsive to said temperature sensor, for controlling on and off operation of said fan to thus assist in controlling a temperature of the airflow being circulated through said airflow duct and back into said compartment.

3. The system of claim 1, wherein said fire suppression system includes a first reservoir for holding a quantity of said fire suppression substance, said fire suppression substance being rapidly injectable in a burst directly into said airflow duct.

4. The system of claim 3, wherein said fire suppression system includes a second reservoir for holding a quantity of said fire suppression substance that can be released as a metered quantity over a continuous time span.

5. The system of claim 1, wherein said fire suppression system further comprises a smoke detector disposed inside of said compartment.

6. The system of claim 1, wherein said airflow management system further comprises an auxiliary airflow supply duct in communication with said airflow duct for supplying an auxiliary airflow into said airflow duct.

7. The system of claim 1, wherein said airflow management system further comprises an auxiliary airflow exhaust duct for enabling a portion of airflow flowing inside of said airflow duct to be exhausted from said airflow duct.

8. The system of claim 1, wherein said fire suppression substance comprises a Halon gas.

9. The system of claim 1, wherein said heater is disposed in said airflow recirculation duct for heating air being recirculated through said airflow recirculation duct, said heater being responsive to control signals from said controller.

10. The system of claim 1, wherein said fire suppression system comprises:
   a smoke detector disposed in said cargo stowage compartment;
   a first reservoir for rapidly supplying a quantity of said fire suppression substance directly into said airflow recirculation duct;
   a first valve for controlling the release of said fire suppression substance into said airflow recirculation duct; and
   a fire detection and suppression controller for controlling said first valve, and further being responsive to a signal from said smoke detector indicating the presence of smoke within said cargo stowage compartment.

11. The system of claim 10, further comprising:
   a second reservoir for supplying a metered quantity of said fire suppression substance directly into said airflow recirculation duct; and
   a second valve, responsive to said fire detection and suppression controller, for enabling and interrupting a flow of said fire suppression substance into said airflow recirculation duct.

12. The system of claim 11, further comprising a filter and regulator assembly for regulating a flow of said fire suppression substance from said second reservoir.

13. The system of claim 12, wherein said fire suppression substance comprises Halon gas.

14. The system of claim 1, wherein said fire suppression system includes:
   a first reservoir for holding a first quantity of said fire suppression substance that is rapidly injectable in a burst directly into said airflow duct; and
   a second reservoir for holding a second quantity of said fire suppression substance that can be released as a metered quantity over a continuous time span; and
   a fire detection and suppression controller in communication with said controller for controlling the release of first and second quantities of said fire suppression substance.

15. A method for monitoring and controlling an ambient environment within a compartment of a mobile platform, the method comprising: using an airflow recirculation conduit to circulate airflow into said compartment and out from said compartment; using a controller to control a heating component to heat the airflow flowing through the airflow recirculation conduit into said compartment; monitoring for the presence of at least one of a fire condition and a smoke condition within said compartment; if either one of said fire condition or said smoke condition is detected, then releasing a fire suppression substance directly into said airflow recirculation conduit; monitoring a temperature of said heated airflow flowing through said airflow recirculation conduit and modifying said temperature of said airflow to maintain a desired ambient environment within said compartment; and when the release of the fire suppression substance is detected, then using the controller to interrupt operation of the heater in heating the airflow flowing through the airflow recirculation conduit into the compartment.

* * * * *